US008429738B1

(12) United States Patent
Hughes et al.

(10) Patent No.: US 8,429,738 B1
(45) Date of Patent: *Apr. 23, 2013

(54) METHOD AND SYSTEM FOR PERFORMING ASYNCHRONOUS CRYPTOGRAPHIC OPERATIONS

(75) Inventors: John R. Hughes, Seattle, WA (US); Richard Roderick Masters, Seattle, WA (US); David D. Schmitt, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,709

(22) Filed: Nov. 21, 2011

Related U.S. Application Data

(63) Continuation of application No. 12/057,208, filed on Mar. 27, 2008, now Pat. No. 8,091,125, which is a continuation of application No. 10/308,844, filed on Dec. 2, 2002, now Pat. No. 7,376,967.

(60) Provisional application No. 60/348,970, filed on Jan. 14, 2002.

(51) Int. Cl.
*G06F 9/00* (2006.01)
(52) U.S. Cl.
USPC .............................. 726/14; 380/30; 713/189
(58) Field of Classification Search .................. 726/14; 380/30, 52; 713/189, 192
See application file for complete search history.

(56) References Cited

U.S. PATENT DOCUMENTS

| 5,319,638 | A | 6/1994 | Lin |
| 5,825,890 | A | 10/1998 | Elgamal et al. |
| 5,956,509 | A | 9/1999 | Kevner |
| 6,026,424 | A * | 2/2000 | Circenis ................. 718/104 |
| 6,052,785 | A | 4/2000 | Lin et al. |
| 6,061,454 | A | 5/2000 | Malik et al. |
| 6,101,255 | A * | 8/2000 | Harrison et al. ............ 380/52 |
| 6,219,711 | B1 * | 4/2001 | Chari ........................ 709/232 |
| 6,223,287 | B1 | 4/2001 | Douglas et al. |
| 6,367,009 | B1 | 4/2002 | Davis et al. |
| 6,584,567 | B1 | 6/2003 | Bellwood et al. |
| 6,643,701 | B1 | 11/2003 | Aziz et al. |
| 6,674,717 | B1 | 1/2004 | Duong-van et al. |
| 6,681,327 | B1 | 1/2004 | Jardin |

(Continued)

FOREIGN PATENT DOCUMENTS

WO 0076119 A1 12/2000

OTHER PUBLICATIONS

About Computing & Technology, "Wireless/Networking, Nagle Algorithm," visited Dec. 6, 2005, 2 pages http://compnetworking.about.com/od/tcpip/l/bldef_nagle.htm.

(Continued)

*Primary Examiner* — Samson Lemma
(74) *Attorney, Agent, or Firm* — Frommer Lawrence & Haug LLP; Jamie L. Wiegand

(57) ABSTRACT

A system and method for performing asynchronous cryptographic operations. A cryptographic toolkit receives requests for cryptographic operations, and initiates the cryptographic operations within a thread of execution. The toolkit detects when the cryptographic operations are complete, retrieves the results, and returns the results to a calling program. The cryptographic operations are performed in an asynchronous manner, without blocking a calling program. The calling program can specify whether the requested operations are to be performed without blocking.

20 Claims, 5 Drawing Sheets

U.S. PATENT DOCUMENTS

| | | | |
|---|---|---|---|
| 6,718,388 | B1 | 4/2004 | Yarborough et al. |
| 6,778,667 | B1 | 8/2004 | Bakhle et al. |
| 6,983,382 | B1 * | 1/2006 | Hartke et al. ............ 726/4 |
| 2002/0164019 | A1 * | 11/2002 | Fairclough et al. ......... 380/44 |
| 2002/0166000 | A1 * | 11/2002 | Rossi et al. ............ 709/328 |
| 2003/0041252 | A1 | 2/2003 | Fung et al. |
| 2003/0097592 | A1 | 5/2003 | Adusumilli |
| 2003/0177348 | A1 | 9/2003 | Davies et al. |
| 2005/0063303 | A1 | 3/2005 | Samuels et al. |
| 2005/0074007 | A1 | 4/2005 | Samuels et al. |
| 2005/0108420 | A1 | 5/2005 | Brown et al. |
| 2005/0187979 | A1 | 8/2005 | Christensen et al. |
| 2005/0265235 | A1 | 12/2005 | Accapadi et al. |

OTHER PUBLICATIONS

Australia's Academic and Research Network, "Programs and Large MTU, Nagle Algorithm," visited Dec. 9, 2005, 3 pages http://www.aarnet.edu.au/engineering/networkdesign/mtu/programming.html.

Berners-Lee, T. et al., RFC 1945, "Hypertext Transfer Protocol—HTTP/1.0," May 1996, 51 pages.

Dierks, T. et al., RFC 2246, The TLS Protocol, Version 1 0, Jan. 1999, 80 pages.

Fielding, R. et al., RFC 2616, "Hypertext Transfer Protocol—HTTP/1.1," Jun. 1999, 114 pages.

fifi.org, "Manpage of TCP," visited Dec. 9, 2005, 6 pages http://www.fifi.org/cgi-bin/man2html/usr/share/man/man7/tcp.7.gz.

Freer, A. et al, Netscape Communications Corporation, "The SSL Protocol, Version 3.0," Mar. 1996, 60 pages.

Kessler, G. et al., RFC 1739, "A Primer on Internet and TCP/IP Tools," Dec. 1994, 46 pages.

Nagle, J., RFC 896, "Congestion Control in IP/TCP Internetworks," Jan. 6, 1984, 13 pages.

OpenSSL, visited Apr. 12, 2006, 1 pages http://www.openssl.org.

Paxson, V., RFC 2525, "Known TCP Implementation Problems," Mar. 1999, 61 pages.

Rescorla, E., "SSL and TLS, Designing and Building Secure Systems," 2001, Addison-Wesley, 46 pges.

RSA Laboratories, "PKCS #1 v2.0: RSA Cryptography Standard," Oct. 1, 1998, 35 pages.

SearchNetworking.com, "Nagle's Algorithm," visited Dec. 6, 2005, 3 pages http://searchnetworking.techtarget.com/sDefinition/0,,sid7_gci754347,00.html.

Tormasov, A. et al., "TCP/IP Options for High-Performance Data Transmission," visited Dec. 9, 2005, 4 pages http://builder.com.com/5100-8732-105878.html.

W3C, "HTTP/1.1 and Nagle's Algorithm," visited Dec. 6, 2005, 3pages http://www.w3.org/Protocols/HTTP/Performance/Nagle.

Silberschatz, A., "Applied Operating System Concepts," 2000, first edition, pp. 96-98.

Official Communication for U.S. Appl. No. 10/308,844 mailed Jul. 17, 2006.

Official Communication for U.S. Appl. No. 10/308,844 mailed Jun. 14, 2007.

Official Communication for U.S. Appl. No. 10/308,844 mailed Nov. 27, 2007.

Official Communication for U.S. Appl. No. 10/308,844 mailed Feb. 15, 2008.

Official Communication for U.S. Appl. No. 12/057,208 mailed Aug. 4, 2010.

Official Communication for U.S. Appl. No. 12/057,208 mailed Jan. 21, 2011.

Official Communication for U.S. Appl. No. 12/057,208 mailed Aug. 18, 2011.

* cited by examiner

METHOD AND SYSTEM FOR PERFORMING ASYNCHRONOUS CRYPTOGRAPHIC OPERATIONS

CROSS-REFERENCE TO RELATED APPLICATIONS

This application is a continuation patent application of U.S. patent application Ser. No. 12/057,208, filed Mar. 27, 2008, which in turn is a continuation patent application of U.S. patent application Ser. No. 10/308,844, filed Dec. 2, 2002, the benefit of which are each claimed under 35 U.S.C. §120, and further claims the benefit under 35 U.S.C. §119(e) of U.S. Provisional Application Ser. No. 60/348,970 filed on Jan. 14, 2002, each of which are incorporated herein by reference in their entirety.

FIELD OF THE INVENTION

This application relates generally to cryptographic techniques, and, more specifically, to techniques for accelerating performance of cryptographic operations.

BACKGROUND

Many web sites today use the Secure Sockets Layer and Transport Layer Security (SSL) protocols to achieve end-to-end secure communications, particularly in the areas of electronic commerce and financial services. The SSL protocol is described in Netscape Communications Corp., Secure Sockets Layer (SSL) version 3, (November 1996). The TLS protocol is derived from SSL, and is described in Dierks, T., and Allen, C., "The TLS Protocol Version 1.0," RFC 2246 (January 1999), available at the Internet Engineering Task Force (IETF). As used throughout this application, including the claims, SSL refers to SSL, TLS, and all secure communications protocols derived therefrom. A widely used SSL-enable protocol today is the Hypertext Transport Protocol (HTTP) encapsulated in an SSL connection, commonly known as HTTPS. The HTTP protocol is described in "Hypertext Transport Protocol (HTTP) version 1.0, RFC 1945 (May 1996)" and "Hypertext Transport Protocol (HTTP) version 1.1, RFC 2616 (June 1999)". The SSL protocol's authentication mechanism typically requires web servers to perform computationally expensive mathematical operations, the effects of which are fewer requests serviced per unit time and higher latency in processing individual requests.

The SSL protocol provides several methods to authenticate both parties to an SSL connection, the most common of which is the use of Rivest-Shamir-Adleman (RSA) authentication pas part of a public key infrastructure (PKI). This is described in RSA Cryptography Standard, PKCS #1 Version 2.0 (Nov. 1, 1993), available from RSA's website. In common usage, web servers will authenticate themselves to clients, but not vice-versa. As part of this procedure, the authenticating party performs a computationally expensive RSA "signing" operation in a full SSL handshake. This calculation is very time consuming and comprises the single largest bottleneck in short-lived SSL connections.

DETAILED DESCRIPTION

Figure 1:
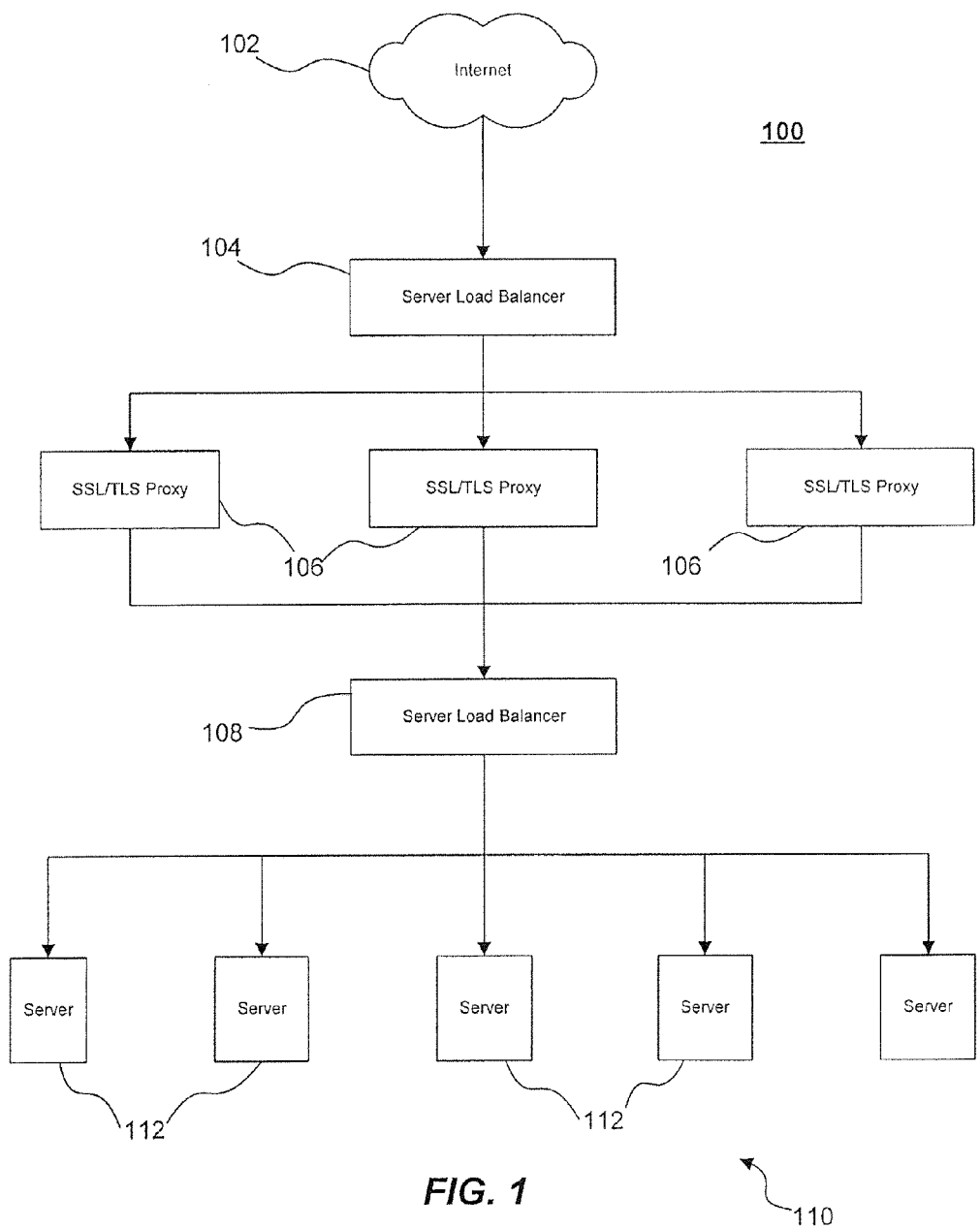
FIG. 1 is a system diagram of a computer network in which the invention may be practiced.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims. The phrase "in one embodiment" as used herein does not necessarily refer to the same embodiment, though it may. As used herein, the term "or" is an inclusive "or" operator, and is equivalent to the term "and/or", unless the context clearly dictates otherwise.

The present invention is a system and method for improving performance of cryptographic operations. In one embodiment, a single process or thread of execution cooperates with a modified cryptographic toolkit, which off-loads portions of a cryptographic protocol in an asynchronous manner. In one embodiment, a number of threads of execution each perform the method of the invention. The threads may be in a single process or in a number of processes. The invention is described herein with reference to an SSL toolkit and the performance of cryptographic operations such as an RSA signing operation. It is to be understood that these references are exemplary in order to simplify the discussion, and that the invention can be practiced with other cryptographic operations and toolkits other than SSL toolkits.

One approach to improving performance of RSA signing operations is to use an accelerator card. The Rainbow CryptoSwift PCI card, made by Rainbow Technologies, of Irvine, Calif., is one such accelerator card. The accelerator card improves performance as compared with performing all operations in software, because the Rainbow accelerator reduces the modular exponentiation latency. In this approach, software in an SSL-enabled application, such as an SSL proxy or web server, makes calls to the accelerator card using the accelerator application program interface (API). These calls are blocking calls. That is, when a call is made to the accelerator card, the program making the call blocks and waits until the card completes the requested operation. Upon completion of the operation, the controlling program continues. While waiting for the accelerator operation to complete, the SSL-enabled application is unable to process additional client requests.

F5 Networks, Inc. provides an SSL proxy (available in some BIG-IP products), which alleviates load on web server pools by stripping or "terminating" SSL from HTTPS (or any protocol fully encapsulated by SSL), and centralizes PKI key/certificate management. The BIG-IP product also can optionally re-encrypt data after performing operations on decrypted data.

One technique for improving performance is to use multi-threaded or multi-processed applications that establish multiple connections with an accelerator card. The simplifications of multi-threaded and multi-processed architectures often allow complex problems to be solved in an easier manner than with single-threaded, single-processed applications. However, the use of multiple threads and context switching adds overhead that limits the performance of such techniques.

FIG. 1 shows components of an exemplary environment 100 in which the invention may be practiced. Not all of the components are required to practice the invention, and variations in the arrangement and type of the components may be made without departing from the spirit or scope of the invention.

FIG. 1 shows a wide area network, such as the Internet 102 that communicates with a server load balancer 104. The server load balancer routes each incoming packet of network traffic to one of a set of one or more SSL proxies 106. Each SSL proxy performs decryption and encryption operations, and forwards plaintext network traffic to a second server load balancer 108. Plaintext is ordinary unencrypted text and/or binary data. The second server load balancer 108 routes incoming packets to servers 112 within a server array 110, which includes one or more servers 112. Alternate configurations of network devices can also be used with the present invention.

Figure 2:
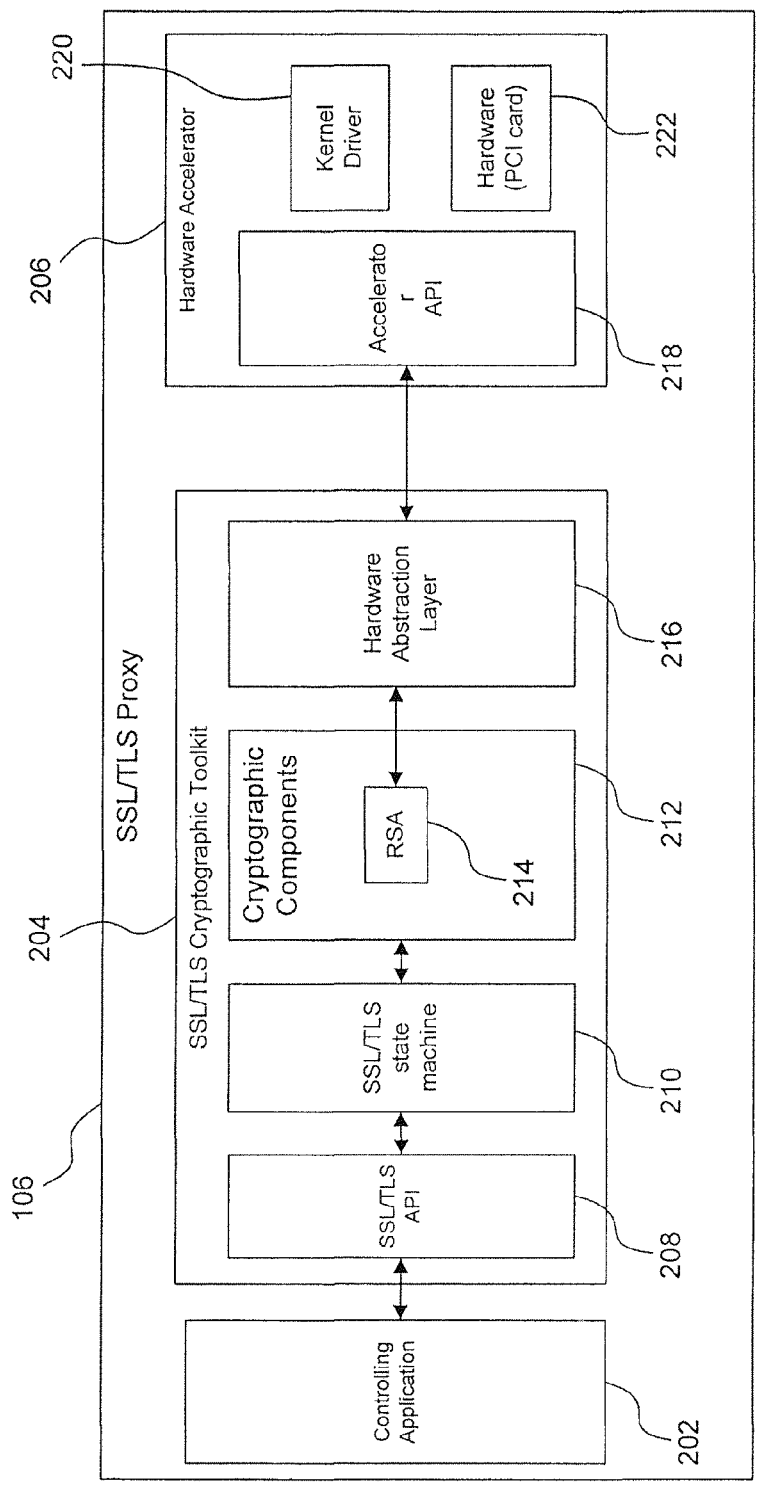
FIG. 2 is a block diagram of an exemplary network device that may be employed to perform the invention.

FIG. 2 is a block diagram illustrating components within an SSL proxy 106, in accordance with one embodiment of the present invention. The SSL proxy 106 includes a controlling application 202, an SSL cryptographic toolkit 204, and a hardware accelerator 206. In one embodiment, the SSL cryptographic toolkit 204 is the OpenSSL toolkit that has been modified to incorporate the inventive features described herein. It should be noted that, while the invention is described herein as employing an SSL proxy and an SSL cryptographic toolkit, the invention may also be practiced in other cryptographic applications, and is not limited to those involving SSL.

The SSL cryptographic toolkit includes an SSL API 208, which is an interface used for communication between the controlling application 202 and the SSL cryptographic toolkit 204. The SSL cryptographic toolkit 204 further includes an SSL state machine 210, cryptographic components 212, and a hardware abstraction layer. The cryptographic components 212 include an RSA module 214. The RSA module performs RSA cryptographic computations that may be offloaded to a hardware accelerator 206 via the hardware abstraction layer 216. In one embodiment, the SSL cryptographic toolkit is implemented as software executing on a CPU (not shown) within the SSL proxy 106. In another embodiment, at least some of the components of the SSL cryptographic toolkit 204 are implemented in hardware or by a combination of software and hardware. The functions of the SSL proxy can be distributed between hardware and software in a number of different ways.

As illustrated in FIG. 2, the hardware accelerator 206 includes an accelerator API 218, a kernel driver 220, and a PCI card 222. The Rainbow CryptoSwift PCI card, made by Rainbow Technologies, of Irvine, Calif., is one such PCI card.

One actual embodiment of the present invention uses a modified version of the Open SSL cryptographic toolkit (available at Open SSL's website) as the SSL cryptographic Toolkit 204. In this embodiment, the SSL API 208, the SSL state machine 210, the cryptographic components, and the RSA module 214 are modified versions of the standard OpenSSL distribution. The OpenSSL cryptographic toolkit and the Open SSL API have been modified in order to allow a single-process single-threaded application to continue servicing other connections during the time in which one or more connections are awaiting the result of a hardware-accelerated RSA signing operation. These modifications include extensions to the OpenSSL API and changes in existing API functions' semantics. The changes to the OpenSSL API take effect only when the controlling application indicates to OpenSSL its ability and desire to utilize the more efficient methods and API semantics, thus retaining Open SSL's backward compatibility with legacy applications. This approach improves the overall performance of the SSL proxy in terms of SSL connections processed per unit time and reduced latency in servicing each SSL connection.

The following table identifies a subset of API functions within the SSL API 208. These include new functions that have been added to the OpenSSL API and modifications to existing OpenSSL API functions.

| SSL API function | Changes to the OpenSSL toolkit made by the present invention |
| --- | --- |
| SSL_accept<br>SSL-read<br>SSL-write | These functions return with a value less than zero and set the global error variable errno to a value defined by the constant EAGAIN to in cases where a non-blocking hardware-accelerated RSA signing operation was initiated. |
| SSL_get_hw_fd | This new function returns the file descriptor corresponding to the non-blocking hardware-accelerated RSA signing operation. When the RSA signing operation result is ready, the accelerator driver marks this descriptor ready for reading. If no non-blocking hardware operation was initiated, −1 is returned |
| SSL_set_use_nonblocking_hw | This new function is used by the application to indicate to the SSL cryptographic toolkit that is supports and desires to use the performance enhancements provided by the present Invention. If this function is not called by the application, the SSL cryptographic toolkit will not use the non-blocking acceleration enhancements and will remain backward-compatible with legacy applications. |
| SSL_get_use_nonblocking_hw | This new function is used by the application to query the SSL cryptographic toolkit for the current enabled/disabled status of the performance enhancements provided by the present invention. |

In one embodiment of the present invention, the SSL cryptographic toolkit 204 constructs data structures (as defined by the hardware accelerator vendor) and calls the corresponding non-blocking cryptographic accelerator API functions. It also retains additional relevant state information regarding the progress of each SSL connection with respect to hardware-accelerated operations. API functions in the SSL API 208 reflect and communicate the status of non-blocking hardware-accelerated operations and their corresponding event notification parameters. Additionally, a generic hardware abstraction layer 216 eases the integration of a variety of hardware accelerators with the present invention. This layer directly communicates with the accelerator API 218.

In one embodiment of the present invention, the SSL cryptographic toolkit 204 stores the global enabled/disabled status of the non-blocking enhancements, as well as augmenting each SSL connection data structure with additional storage reserved for state information regarding non-blocking hardware-accelerated operations in progress. This abstraction layer internally maintains the data structures specific to each hardware acceleration device, and exposes a common interface to initiate, retrieve the result of, and cancel non-blocking hardware-accelerated operations.

In one embodiment of the present invention, the controlling application 202 recognizes when the cryptographic toolkit has initiated a non-blocking hardware-accelerated cryptographic operation by use of function return values and error codes. The controlling application 202 queries the cryptographic toolkit 204 for the vent notification parameters necessary to asynchronously respond to completed hardware accelerated operations. Further, the controlling application 202 retains additional application application-relevant state information regarding the progress of each SSL connection with respect to hardware-accelerated operations.

Immediately after application initializes the cryptographic toolkit 204, it informs the toolkit that it is capable of using and desires to use the non-blocking features provided by the present invention. One actual implementation uses the function SSL_set_use_nonblocking_hw for this purpose. In one embodiment, an application can delay this notification, even until after it had begun processing SSL connections using the toolkit. In one embodiment, applications are restricted to continue using the non-blocking enhancements once they signal their ability and desire to do so. This restriction allows the non-blocking hardware-accelerated operations already initiated to properly complete.

In one embodiment, in order for the controlling application 202 to recognize when the cryptographic toolkit 204 has initiated a non-blocking hardware-accelerated cryptographic operation, the application calls the function SSL_get_hw_fd in the SSL API 208. This function returns either a standard UNIX file descriptor with a value grater than or equal to zero corresponding to the non-blocking cryptographic operation, or if no non-blocking operation was initiated, this function returns a value of –1. A non-blocking hardware-accelerate operation might occur during an SSL handshake, but also might occur at any time after an initial handshake establishes an SSL connection. The controlling application 202 therefore checks whether or not a non-blocking hardware-accelerated operation was initiated following all connection-oriented SSL API calls, e.g. SSL_read, SSL_write, and SSL_accept. If these calls return a non-blocking error (indicated by the function returning a value less than zero and the global error variable errno having been set to the value defined by the constant EAGAIN), the controlling application 202 then uses the SSL_get_hw_fd function as described above.

If the SSL_get_hw_fd function returns a valid UNIX file descriptor (having a value greater than or equal to zero), the controlling application 202 waits until that descriptor is marked as ready for reading, and then retries the same SSL API function that initiated the non-blocking hardware-accelerated operation. Since the SSL connection corresponding to the non-blocking operation cannot make any progress until that operation is completed, controlling applications might take steps to temporarily ignore other events pertaining to that same SSL connection in the interest of increased efficiency. In one embodiment, applications doing so retain additional connection state regarding the status of any non-blocking hardware-accelerated operations in progress. One implementation includes recording and storing the results of SSL_get_hw_fd calls inside of the application's corresponding connection data structures.

Figure 3A:
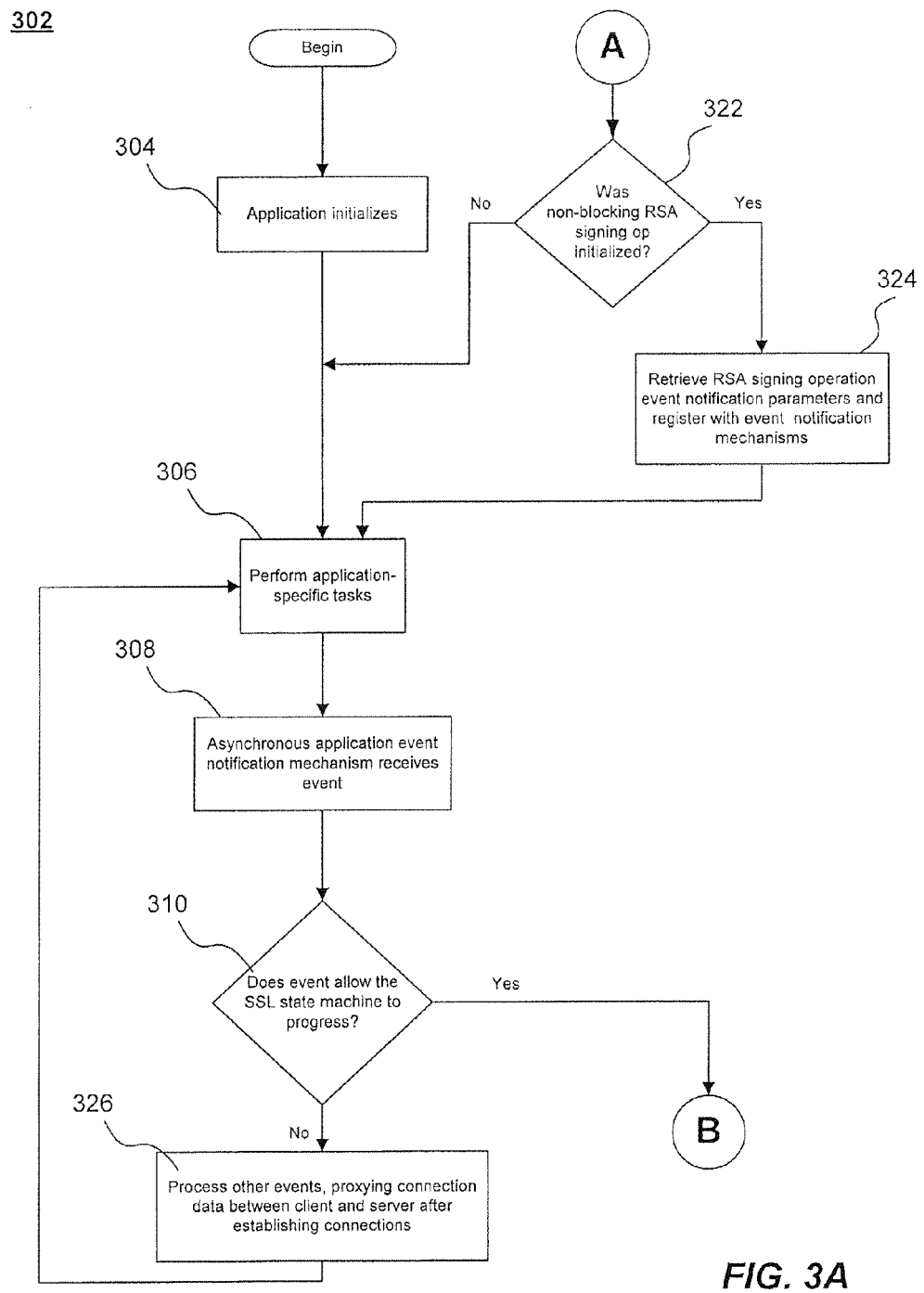
FIGS. 3A-B are flowcharts illustrating a process for performing asynchronous cryptographic operations.
Figure 3B:
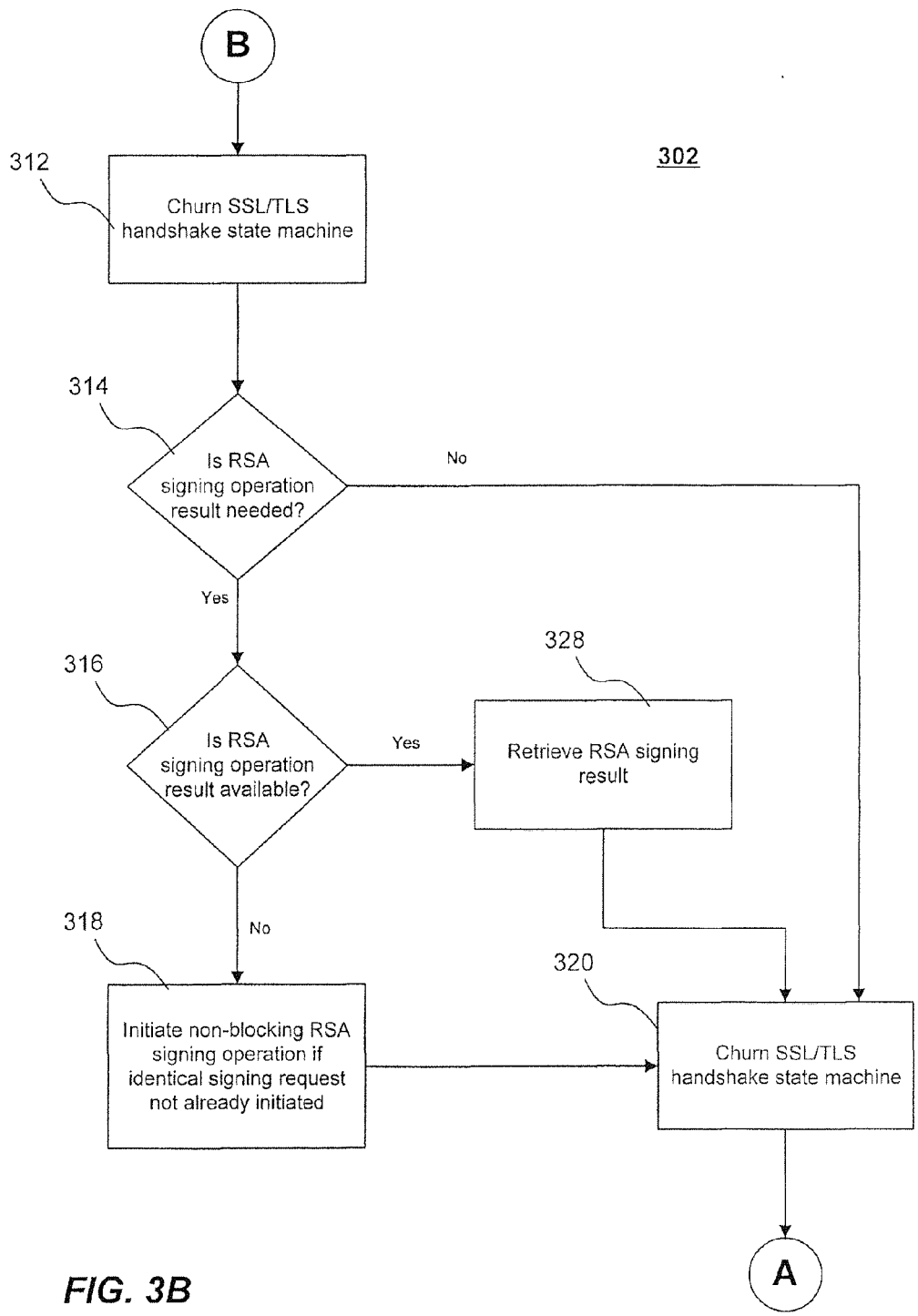

FIGS. 3A-B illustrates a process 302 for performing single-threaded, non-blocking SSL acceleration, in accordance with an embodiment of the invention. In one embodiment, some of the actions of the process 302 are performed by a controlling application 202 (FIG. 2), and some of the actions are performed by a cryptographic toolkit, such as SSL cryptographic toolkit 204. In one embodiment, the actions illustrated in FIG. 3A are performed by the controlling application, and the actions illustrated in FIG. 3B are performed by the cryptographic toolkit. In the following discussion, an RSA signing operation is used as an exemplary cryptographic operation, though the process 302 can be used for other types of cryptographic operations. After a start block, the process moves to a block 304, at which point the controlling application 202 performs an initialization. At a block 306, the controlling application 202 performs application-specific tasks. At a block 308, the application receives an event through an asynchronous application event notification mechanism. At a block 310, a decision is made of whether the event allows the SSL state machine to progress. For example, in one embodiment, events that allow the SSL state machine to progress include protocol events corresponding to the SSL protocol, in the expected order, such as an SSL server receiving a ClientKeyExchange, ChangeCipherSpec messages, or a finished message. In one embodiment, events corresponding to a different connection from the one in question, or events that are received out of order, do not allow the SSL state machine to progress for the connection in question.

If, at the block 310, the decision is yes, the process moves to a block 312 (FIG. 3B), where the SSL cryptographic toolkit churns the SSL handshake state machine. Churning the SSL handshake state machine refers to the processing of events and data received for the purpose of progressing the SSL protocol for a given connection. Since groups of messages or individual message data might be received incomplete, out of order, or with delays, a state machine keeps track of the current status of the connection. At a block 314, the SSL cryptographic toolkit makes a decision of whether an RSA signing operation result is needed. If the decision at block 314 is yes, the process proceeds to a block 316. At a block 316, the SSL cryptographic toolkit makes a decision of whether an RSA signing result is available. If the decision at block 316 is no, the process proceeds to a block 320, where the SSL handshake state machine is churned again, as discussed with reference to the block 312. The process then proceeds to a block 320, where the SSL handshake state machine is churned again, as discussed with reference to the block 312. The process then proceeds to a block 322 (FIG. 3A), where a decision is yes, the process proceeds to a step 324, where the controlling application retrieves RSA signing operation event notification parameters and registers with an event notification mechanism. The process then proceeds to block 306 to perform application specific tasks. In one embodiment, the controlling program periodically polls to determine if an operation is completed. In one embodiment, the controlling program receives an asynchronous notification event indicating the completion of a cryptographic operation.

If, at decision block 316 (FIG. 3B), an RSA signing result is available, and therefore the decision is yes, the process to a block 328 where the SSL cryptographic toolkit retrieves the RSA signing result. The process then continues at block 320 as discussed above. When the result is available, the result of the block 314 will be yes and the result of block 316 will be yes for the given SSL connection. In one embodiment, the cryptographic toolkit will not be called again for the same SSL connection that initiated an RSA signing operation until its result is ready.

If, at decision block 322 (FIG. 3A), a non-blocking RSA signing operation has not been initiated, and therefore the decision is no, the process proceeds to block 306, where application-specific tasks might be performed.

At block 310, if the decision is no, the process proceeds to a block 326, where the controlling application processes events and proxies connection data between the client and sever after establishing connections. The process then proceeds to block 306 to continue the loop.

Employing the present invention, the SSL Cryptographic Toolkit 204 can perform different types of cryptographic operations concurrently. For example, a controlling application 202 can request an RSA signing operation, an RSA verification operation, an RSA encryption operation, and an RSA decryption operation such that they all perform concurrently. The first operation requested is not necessarily the first operation completed. This is particularly advantageous when requesting a relatively fast operation such as RC4 decryption after a relatively slow operation such as RSA signing. Additionally, cryptographic requests involving different key sizes can be made concurrently. For example, a controlling application 202 may request an RSA signing with a key size of 1024 bits followed by a request for an RSA signing with a key size of 512 bits. Since the former operation takes longer than the latter, the 512 bit signing may complete prior to the completion of the 1024 bit signing.

The above discussion uses modifications of the OpenSSL cryptographic toolkit; this implementation is merely illustrative. Similar mechanisms are readily applied to other cryptographic toolsets, whether they are implemented as software libraries or as hardware components. The above description of the invention includes asynchronous off-loading of RSA signing operations. It should be noted that other portions of the SSL protocol could be off-loaded in similar fashion with additional modifications to the cryptographic toolkit API and applications using it. The present invention is described in the environment of a traffic management device, using asynchronous acceleration enhancements to an SSL proxy. It should be noted that the present invention could be applied to any SSL-enabled application using a cryptographic toolset capable of off-loading portions of the SSL protocol to secondary processing devices.

Figure 4:
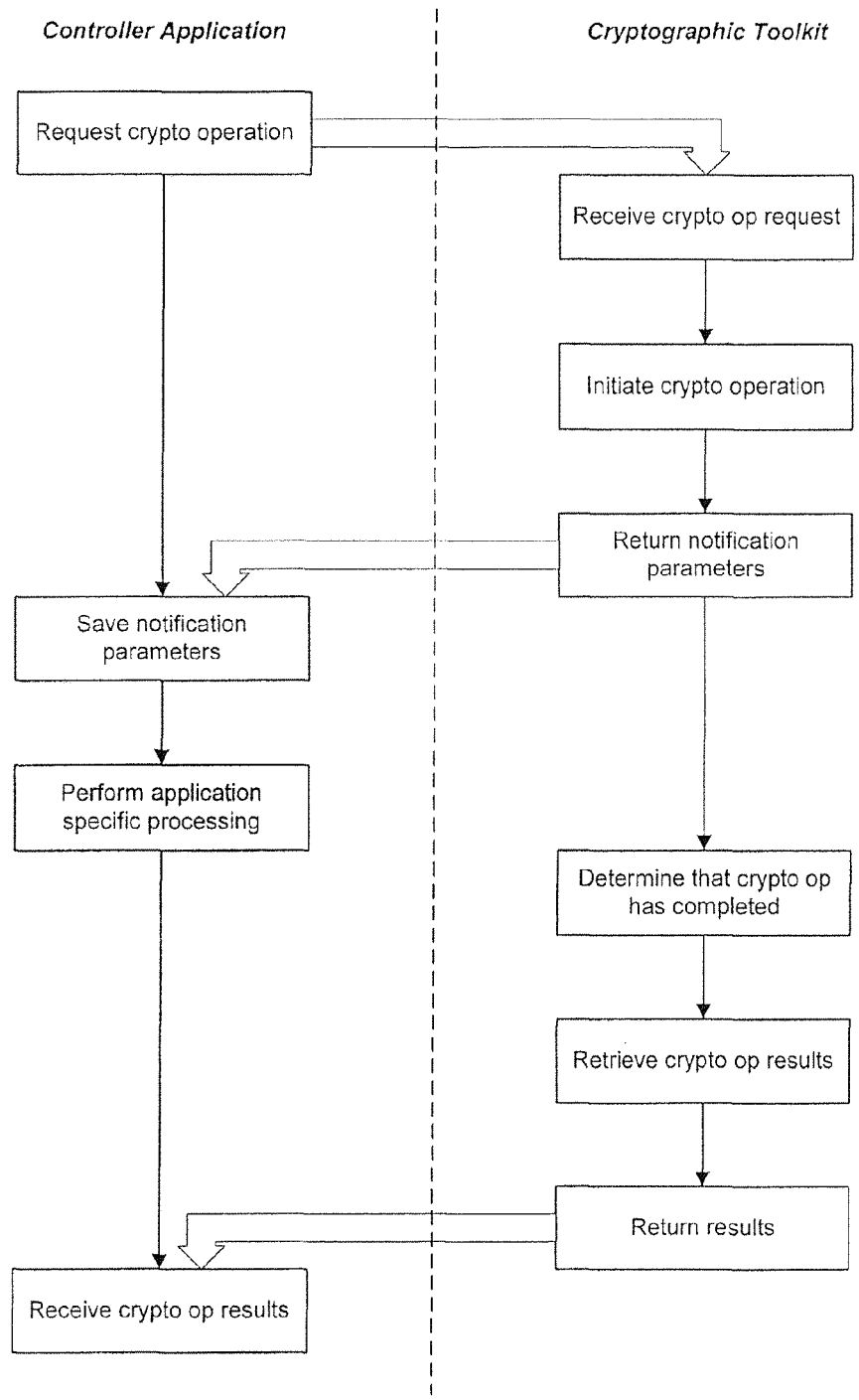
FIG. 4 is a flowchart illustrating interactions between a controller application and a cryptographic toolkit, in accordance with the present invention.

In the paragraphs that follow, several aspects of the present invention, and examples of its use are stated. The invention, however, is not limited to these aspects or examples. FIG. 4 is a flowchart illustrating a process for performing an asynchronous cryptographic operation.

In one aspect of the present invention, a cryptographic toolkit receives a first request for cryptographic processing from a controlling program, initiates a corresponding first cryptographic operation, and receives and begins a second request for cryptographic processing prior to the completion of the first cryptographic operation.

In another aspect of the present invention, the cryptographic toolkit initiates a second SSL operation corresponding to the second request for cryptographic processing prior to the completion of the first cryptographic operation.

In yet another aspect of the present invention, initiating the cryptographic operations includes communicating with an SSL accelerator that is at least partially implemented in hardware.

In still another aspect of the present invention, the program receives the requests for a cryptographic operation and initiates the cryptographic operations within a single thread of operation and within a single process.

In still yet another aspect of the present invention, the controlling program is not blocked as a result of requesting the cryptographic operation, and performs additional processing after requesting the cryptographic operation and before receiving the results of the cryptographic operation.

In a further aspect of the present invention, the controlling program specifies whether it desires to be blocked during the time that the cryptographic operation is being performed. The specification may be included in the request for the cryptographic operation, or it may be passed to the cryptographic toolkit prior to submitting the request for the cryptographic operation.

In a still further aspect of the present invention, in response to receiving a request for a cryptographic operation, the cryptographic toolkit returns a value corresponding to the cryptographic operation. This value is subsequently used by the controlling program to retrieve the results of the cryptographic operation. The value can be a file descriptor or other type of identifier, and the controlling program can use this value to determine when the cryptographic operation is complete.

In one exemplary application of the present invention, the cryptographic operation is an RSA signing operation, and the result of the operation is an RSA signature. The cryptographic operation can also be a cryptographic hashing function, an encryption function, a decryption function, or a portion of a cryptographic function. RC4, DES, 3DES, MD5, and SHA-1 are examples of these functions. These can also be applied to larger portions of the SSL handshake, including SSL record processing.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A hardware device that is configured to perform cryptographic operations, comprising:
a memory for storing instructions; and
a processor for performing instructions to perform actions, including:
requesting a first cryptographic operation be performed within a plurality of cryptographic operations, the first cryptographic operation being a non-blocking operation during or after secure communications protocol connection;
requesting a second cryptographic operation after requesting that the first cryptographic operation be performed and prior to completion of the first cryptographic operation;
wherein at least one of the cryptographic operations is at least a part of a secure communication protocol handshake; and
selectively receiving a result of the second cryptographic operation prior to receiving a result of the first cryptographic operation.

2. The hardware device of claim 1, wherein the first and the second cryptographic operation are performed on different data inputs.

3. The hardware device of claim 1, wherein the first cryptographic operation is at least part of a digital signature operation.

4. The hardware device of claim 1, wherein the first cryptographic operation occurs during establishing a secure communication protocol connection, or after an initial secure protocol handshake establishes the secure communication protocol connection.

5. The hardware device of claim 1, wherein the plurality of cryptographic operations are a plurality of concurrent requested cryptographic operations.

6. The hardware device of claim 1, wherein the processor performs actions, further comprising:

in response to receiving the request for the first cryptographic operation, passing an operation identifier to a request sender; and associating the operation identifier with the first cryptographic operation.

7. The hardware device of claim 1, wherein the plurality of cryptographic operations are received asynchronously from a single thread.

8. A non-transitory storage device, comprising:
computer instructions stored thereon that enable execution on a processor of a plurality of components, including:
a cryptographic application program interface (API) including an interface that receives requests for performing cryptographic operations;
a component configured and arranged to perform a plurality of concurrent requested cryptographic operations within a single thread of execution such that at least a first cryptographic operation finishes before a second cryptographic operation and the second cryptographic operation is initiated before the first cryptographic operation, and at least one of the cryptographic operations is at least a part of a secure communication protocol handshake.

9. The non-transitory storage device of claim 8, wherein the component configured and arranged to perform the plurality of concurrent requested cryptographic operations further performs actions, comprising:
receiving, within a thread of execution, a plurality of requests for cryptographic operations, each request having a corresponding cryptographic operation;
initiating, within the thread, the cryptographic operations, so that at least two of the cryptographic operations are performed concurrently, and wherein at least two of the cryptographic operations are performed on different input data;
querying whether each cryptographic operation has completed; and
returning a result for each cryptographic operation.

10. The non-transitory storage device of claim 8, wherein the first and the second cryptographic operation are performed on different data inputs.

11. The non-transitory storage device of claim 8, wherein the secure communication protocol comprises at least one of a secure communication handshake, or a secure communication read, write, or accept.

12. The non-transitory storage device of claim 8, wherein the first cryptographic operation being a non-blocking operation.

13. The non-transitory storage device of claim 8, wherein the first cryptographic operation or the second cryptographic operation includes a cryptographic signing operation.

14. The non-transitory storage device of claim 8, wherein at least some of the cryptographic operations are performed by a hardware accelerator.

15. A non-transitory storage device, comprising:
computer instructions stored thereon that enable execution on a processor of a plurality of components, including:
a receiving component that receives cryptographic requests from a controlling program to perform a plurality of cryptographic operations, each cryptographic request having a corresponding cryptographic operation and at least one of the cryptographic operations is at least a part of a secure communication protocol handshake;
an output component that provides cryptographic results of the plurality of cryptographic operations to the controlling program, each result corresponding to one of the cryptographic requests; and
a performance component configured to enable the plurality of cryptographic operations such that the requests are received asynchronously from a single thread, and the results are provided to the single thread, wherein at least one of the cryptographic results is provided in an order that does not correspond to the order in which the cryptographic requests are received.

16. The non-transitory storage device of claim 15, wherein the cryptographic operations include at least one of the cryptographic operations is a signing operation, a verification operation, an encryption operation, or a decryption operation.

17. The non-transitory storage device of claim 15, wherein at least two of the plurality of cryptographic operations are performed in part on different input data.

18. The non-transitory storage device of claim 15, wherein at least one of the plurality of cryptographic operations is a non-blocking operation.

19. The non-transitory storage device of claim 15, wherein a first cryptographic request is received from a controlling software program that is not blocked from execution by executing the first cryptographic request.

20. The non-transitory storage device of claim 15, wherein at least a first cryptographic request is one of a signing operation, a verification operation, an encryption operation, or a decryption operation.

* * * * *